United States Patent Office 3,579,379
Patented May 18, 1971

3,579,379
PROCESS FOR PRODUCING CONDUCTORS INSULATED WITH POLYETHYLENE TEREPHTHALATE
Franciscus C. A. A. van Berkel, 8 Deerfield Road, Asheville, N.C., and Stanley F. Luques, Lakeview Drive, Columbia, Conn.
Filed Dec. 1, 1966, Ser. No. 598,276
Int. Cl. B44d 1/09, 1/18; C09d 3/48
U.S. Cl. 117—232
8 Claims

ABSTRACT OF THE DISCLOSURE

Process for producing insulated electrical conductors comprising applying a coating of polymeric ethylene terephthalate to electrical conductors, the improvement comprising (1) utilizing molten polyethylene terephthalate having an initial relative viscosity of at least 1.80 and containing from 0.01 to 5% by weight of a liquid crystallization promoting compound, (2) followed by cooling the coating and then (3) heating the cooled coating to a temperature of at least 100° C. to effect a crystallization of at least 15% in said polymeric coating. In the practice of this process, lengthy injection molding cycles and/or unduly long cooling cycles are avoided.

---

This invention relates to the production of insulated electrical conductors. More particularly, the present invention pertains to a wire conductor or multiconductor having a dielectric coating of insulation consisting essentially of an improved polymeric ethylene terephthalate. The invention also relates to a process for coating electrical conductors with the improved polyethylene terephthalate plastic composition.

In the field of insulated electrical wire, the prior art discloses metallic conductors coated with polyethylene terephthalate for insulation purposes. A well known procedure is found in British patent specification No. 599,097. This patent describes a method wherein a copper wire is provided with a coating of the plastic polymer. The coating is obtained by passing the wire directly through a melt of the polymer followed by immediate quenching in cold water. The plastic coating obtained, however, is deficient for many applications which thus far has precluded the patent's process from being extensively used. The major drawback of the process resides in the fact that the polyethylene terephthalate coating is substantially in amorphous form and of relatively low viscosity, i.e., a relative viscosity of less than 1.70. Amorphous polyethylene terephthalate has a relatively low softening point, namely, in the order of about 80° C., and therefore permissible operational conditions are seriously limited; particularly when such polymer is intended to be used for most electrical applications.

While it is true disadvantages associated with a low softening point may be improved upon, or even avoided, by heat treating the amorphous polymer to bring about a crystallization thereof, such procedures in manufacture of polyethylene terephthalate coated conductors is very risky since it would involve heating the generally thin, concentric coatings through the dangerous polymer softening range. Moreover, crystalline polyethylene terephthalate of low relative viscosity is rather brittle and has a low impact strength.

It is, therefore, a principal object of the present invention to provide an improved electrical conductor having a coating of insulation consisting of polyethylene terephthalate with sufficiently high relative viscosity and crystallinity to avoid defects common to prior art types of insulated conductors and which has suitable dielectric and mechanical properties.

A further object of the invention is to provide a process for the manufacture of electrical conductors or wire having a coating of insulation which is inexpensive in terms of operating time.

In general, the objects of the present invention are obtained by coating a preform wire and/or composite electrical conductors with polyethylene terephthalate (PET) having a relative viscosity of at least 1.70 and containing about 0.01 to 5% by weight of a compound which promotes polymer crystallization. It has been found that PET plastic having a relative viscosity of at least 1.70 (as measured in a 1% by weight solution of metacresol at 25° C.), and in the presence of a crystallization promoting liquid, can provide an improved insulation for electrical conductors in regard to certain physical and mechanical thermostability and high impact strength.

The crystallization promoting compounds which are employed in the practice of the invention include those selected from the group of aliphatic, aromatic, and mixed aliphatic-aromatic ketones and amines, and halogenated aliphatic hydrocarbons. Examples of suitable compounds from the above groupings include, for example, methylethyl ketone, methyl-n-propyl ketone, methyl-n-butyl ketone, acetone, diphenyl amine and tetrachloroethane. Other materials suitable include tetralin, benzyl alcohol, benzene, toluene, dioxane, acrylonitrile, nitromethane and nitroethane and others. Particularly favorable results are obtained when using benzophenone. Benzophenone has been found to readily promote crystallization and makes it possible to obtain a dielectric which excels in fine crystalline structure and which is further characterized by a distinct absence of any undesirable color bodies.

Use of the term "liquids" is to be understood as intended for those compounds which are liquid in molten polyethylene terephthalate and therefore they need not necessarily be liquid at room temperature. The liquids may homogeneously be mixed with the polymer or they may be in the form of an emulsion with the polymer. The crystallization promoting compound may be mixed with or absorbed by solid polyethylene terephthalate prior to melting. Alternatively, and which is preferred in those cases where use is made of lower boiling liquids, the promoter is forced into a molten polymer using conventional extruders.

The amount of the crystallization promoter to be used may vary and often is determined empirically. Amounts smaller than 0.01% by weight of the polymer have little effect and amounts greater than 5% by weight could possibly be detrimental on the physical properties of the polymer. Therefore it is preferred that the promoter be employed in varied concentrations between 0.01% and 5%. Concentrations between this range necessary to obtain the best results possible can be readily ascertained by anyone skilled in the art and without undue experimentation.

Polymer (polyethylene terephthalate) crystallinity is of course a well known concept and a number of physical and mechanical properties of coating shaped from polyethylene terephthalate directly depend upon the degree of crystallinity and crystal structure of the polymer. Among such properties are resistance to deformation under conditions of extreme heat or cold, resistance to internal structural stress, abrasion resistance (surface hardness), brittleness, etc. By the incorporation in accordance with the present invention of the above promoting liquids in the plastic, relatively speedy crystallization is effected and, moreover, a fine grain structure and homogeneity is obtained—especially when used in combination with certain nucleating substances, as will be expounded upon further below. Another advantage resides in the fact that lengthy injection molding (or shaping) cycles for applying the coating to the conductors are avoided. Unduly long cooling and/or molding cycles render known processes uneconomical.

As observed in the Journal of Applied Physics, volume 20, 1949, pp. 571-575, the degree of crystallinity may be determined by a simple manner by measuring the specific gravity of the material. A crystallinity of 15% corresponds generally to a density of approximately 1.35 grams per centimeter$^3$. To obtain polymer coatings which have a relative viscosity of at least 1.70, one must allow for degradation of the polymer—which may to some extent occur during the process when using a melt of polyethylene terephthalate; hence starting polymer having an initial relative viscosity of about 1.80 is preferred since loss in viscosity during processing amounts to approximately 0.10 (in terms of relative viscosity). Particularly favorable results are achieved when processing molten polyethylene terephthalate which has been obtained by melting chips wherein the viscosity thereof has been raised to at least 2.0. The increase in chip viscosity can satisfactorily be done by solid state post condensation.

As suggested prevously above, it has also been found that a wide variety of relatively finely divided solid substances (in an undissolved state) can be included in the coating along with the promoters to realize improved results. Such substances are believed to serve as nucleating agents and have a particle size less than 3 microns. Those found particularly suitable include oxides of various light metals such as magnesium oxide, and/or metals in a finely divided solid state and of uniform particle size, i.e., copper or antimony powders, salts of alkaline earth metal such as calcium carbonate, graphite, glass, powder and light materials. Particularly good results are obtained when using calcined gypsum, fumed silica and/or talcum powder. While the amount in which the solid nucleating substances are used of course depends on the nature of the substance, its particle size and uniformity, it has been determined in most cases that an amount of at least 0.001% by weight of the polymer should be included. Percentages above 0.3% by weight have been found to lead to a greater and significant degree of brittleness which increases and becomes completely unsatisfactory when employing amounts in percentages higher than 0.5.

The stage at which the agent may be added to the polymer can vary. For example, addition in situ can take place at an early stage in polymerization reaction or ester interchange reaction and, generally, in a two-step process. Alternatively, a sheet or filamentary preform polyester may be shaped from the polymer and thereafter coated with the solid substance and reprocessed into chips; or the chips may be coated. If desired, coating chips with the solid can be combined with the addition of the crystallization promoting compound. The thus treated chips can then be directly extruded or otherwise applied to the conductor. As briefly stated above, it is basic to the process of invention to use polyethylene terephthalate with a relative viscosity of at least 1.80 to obtain a coating wherein a viscosity of 1.70 is achieved.

An average crystallinity of 15% is found sufficient for purposes of thermostability although higher degrees of crystallinity are preferred in order to enhance other characteristics such as improved mechanical and physical properties of the dielectric.

A method illustrating certain features of this invention may include the steps of continuously advancing the electrically conductive strand or core through an applicator in which the core is enveloped in a sheath of the novel polymeric material used as insulation according to the invention and where means are provided to subject the material to a temperature of at least 100° C. to thereby cause the material to crystallize to an average crystallinity of at least 15%.

Apparatus for facilitating features of the invention may include means for advancing a conductive filamentary core to an applicator designed to apply the novel polymeric sheath or coating of the insulating material upon the electrical conductor, means to cool the thus coated conductor and thereafter heat the conductor to the temperatures required to assist proper crystallization.

Preferably the polyester insulation of the invention is applied utilizing for example, a typical cross-head type extruder. Such extruders are usually provided with a transverse extruding head and wherein the extrudable plastic material is forced by a stock screw into an extrusion passage adapted for positioning a die therein. Such extruders are further provided with means for aligning and guiding an advancing conductor into and through the die.

After passing the core through the extrusion head, prior to subjecting the coating to a crystallization temperature, the coating is cooled sufficiently below the solidification point of the polymer to prevent dripping, deformation or extreme tackiness. While cooling may involve a complete transition to ambient temperature, it preferably is not continued below the aforesaid crystallization temperature range. This avoids unnecessary expense incurred on reheating.

Crystallization may be perfected using either hot air, steam or, for that matter, any suitable inert gas which can be heated to a temperature substantially above 100° C. Steam has been found to be particularly beneficial. By subjecting the sheath to a temperature in the range of 120–190° C. in the presence of steam, a crystallinity of the polymer coating in the range of 25% or higher may be obtained in a relatively short time; i.e., within approximately one minute.

As used in the invention, the term "polyethylene terephthalate" is understood to mean polymeric esters of terephthalic acid which contain a major amount of ester groups. Copolymers of polyethylene terephthalate, preferably containing not more than 10% of the copolymeric constituent can also be used. The polymer can contain additives such as fillers, pigments, stabilizers, or be in contact with extrusion head lubricants, etc.

The novel plastic polyethylene terephthalate may be applied directly to the electrically conductive core or alternatively, it may be applied over known insulations, both organic and inorganic, and include materials such as polyvinyl chloride, polyethylene, polyvinylidene fluoride, polysulfone, polyphenylene oxide, rubber, glass braid, etc.

A complete understanding of this invention may be obtained from the following detailed description of a method embodying certain features thereof when read in conjunction with the attendant drawings in which like numerals represent like parts.

Figure 1:
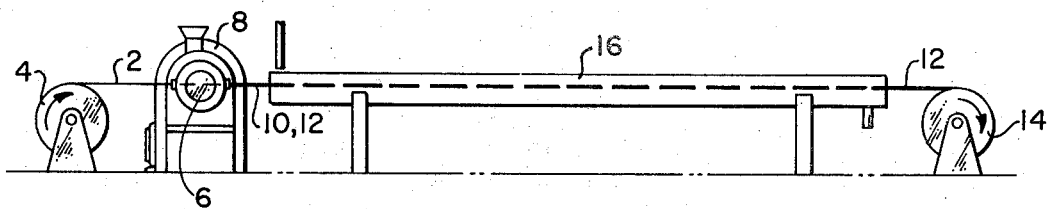
FIG. 1 is a side elevation of apparatus for extruding plastic materials onto an electrically conductive core and is characteristic of a typical embodiment selected for a discontinuous process for coating the conductors with the polymer of the invention.

In accordance with the invention, a conductive filamentary core 2 is advanced continuously from a supply reel 4 to an extrusion head 6 of a plastic extruder 8. Plastic extruder 8 may be of conventional design and is intended to apply a substantially concentric layer 10 of the plastic insulating material according to the invention upon core 2 to form an insulated conductor 12. The thickness of the layer is determined by selection of a die with suitable dimensions. The linear speed of the conductor is determined by a conventional take-up capstan 14 which can rotatably be driven by any suitable electric motor (not shown). Positioned between extruder 8 and take-up capstan 14 is an elongated metal cooling trough 16 which is adapted to contain a circulating cooling liquid. The insulated conductor, after emerging from the extrusion head, enters the cooling liquid contained in the trough and remains submerged therein until cooled to a temperature which would prevent dripping or deformation of the coating. Cooling trough 16 is open at both ends thereof and the depth of the liquid contained therein should be such as to insure a complete submersion of the advancing insulated conductor along its entire length. Assuming that the conductor is passing through the apparatus at a speed of approximately 150 meters/minute, the length of the cooling trough should be approximately 3 meters in order to reach a temperature of approximately 80° C. or less, the distance between the cooling trough (or the steam chamber in a continuous process) and the extruder head should preferably be no more than 60 cm.

Figure 2:
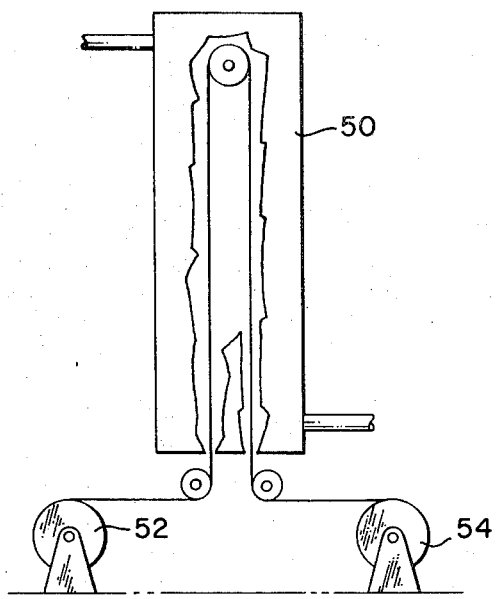
FIG. 2 is an enlarged perspective view of the heating chamber for the wire conductor or multiconductor having the dilectric sheath or coating according to the invention.

FIG. 2 shows a suitable heating chamber, or steam cabinet 50, which may be used according to the invention. The linear speed of the wire coated according to the invention advancing continuously through the heating chamber from a supply capstan 52 is determined by the conventional take-up capstan 54 rotatably driven by a suitable motor (not shown). The heating chamber can be approximately 400 cm. in height and is adapted to contain superheated steam having a temperature of approximately 170° C. The insulated conductor should be advanced through the chamber at a linear speed of approximately 6 meters/minute.

Figure 3:
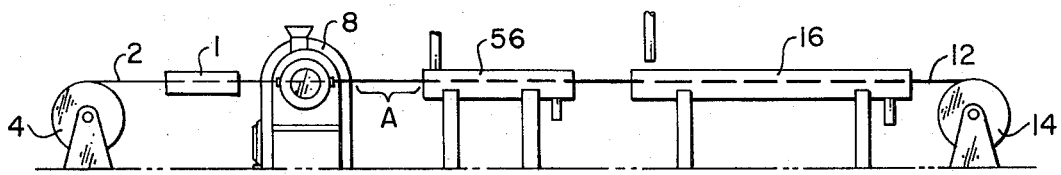
FIG. 3 is a side elevation of apparatus designed for a continuous process of preheating the electrically conductive core, extruding the plastic materials thereon and thereafter cooling and crystallizing the novel polyethylene terephthalate sheath according to the invention.

FIG. 3 represents suitable apparatus for conducting the process of the invention continuously. The conductive filamentary core 2 leaving supply capstan is advanced continuously to a preheater 1 which either can be gas fired or of the electric resistance type. The thus heated core is then advanced to plastic extruder 8. Insulated conductor 12 emerging from the extruder is then air cooled (in zone A) and thereafter advanced continuously through heating chamber 56. Heating chamber 56 can be approximately 2 meters long and is adapted to be supplied with superheated steam and at a temperature of approximately 170° C. The conductor should be advanced through the chamber at a linear speed of approximately 4 m./min. Final cooling is conducted in trough 16.

For purposes of specifically illustrating, without intending to limit the invention, the following examples are provided.

EXAMPLE I

Granular polyethylene terephthalate of relative viscosity 2.05 is mixed with 0.22 weight percent benzophenone and 0.15% by weight calcined gypsum and is subsequently fed from a supply hopper to a melt extruder having an extruder die adjacent thereto through which a wire to be coated is simultaneously passed.

A preform polyethylene covered telephone wire of 1.7 mm. diameter is passed through the die. The die is at a temperature of approximately 290° C. Polyethylene terephthalate at a thickness of approximately 0.2 mm. is extruded around the preform polyethylene coated wire and thereafter passed through a cooling bath containing water of about 15° C. The wire is continuously advanced at a speed of 150 m./min., to the take-up reel.

The wire thus sheathed and collected on the take-up reel is then conducted through a heating zone approximately 8 m. long and containing superheated steam at 170° C. at a speed of about 6 m./min. Allowing for the initial heating up of the wire to the desired temperature, a degree of crystallinity of about 30% is reached in less than one minute.

When using hot air instead of steam a similar crystallinity is reached in 1½ minutes. A corresponding reduction in speed at which the wire travels through the hot air is required in order to reach the degree of crystallinity achieved using steam.

EXAMPLE II

The polyethylene terephthalate composition of Example I is melt extruded onto a steel wire cable of 4.8 mm. diameter to form an insulation of approximately 1.35 mm. thickness. In this experiment the steel wire has a running speed of 4 m./min. and (after initial cooling in air) is subsequently passed through a 2 m. long steam tunnel at 170° C. and a cooling bath prior take-up.

An average retention time of 30 seconds in the steam tunnel results in a crystallinity of 24 to 31% measured from the inside of the sheath.

A more uniform crystallinity of the covering can be achieved by simply heating the steel wire prior to its passage through the extrusion die.

EXAMPLE III

Separate crystallization experiments are carried out on small test samples of 0.7 mm. thickness which were obtained by first melt extruding, followed by immediate cooling to ambient temperature. Polyethylene terephthalate of relative viscosity 2.05 as such (A), containing 0.25 weight percent talcum (B) and containing 0.25 weight percent benzophenone and 0.24 weight percent talcum (C) was used as the plastic extrudant.

The following data relevant to the present invention are obtained.

| Temperature | Heating, time, min. | Percent crystallinity obtained | | |
|---|---|---|---|---|
| | | A | B | C |
| 100° C., in air | 15 | 0 | 0 | 0 |
| | 60 | 0 | 0 | 0 |
| | 120 | 0 | 3 | 15 |
| 100° C., in steam | 3 | 0 | 1 | 1½ |
| | 5 | 1½ | 4 | 8 |
| | 15 | 5 | 10 | 22 |
| | 30 | 9 | 19 | 30 |

On heating the test samples at 140° C. in air similar percentages crystallinity are obtained as for heating at 100° C. in steam.

What is claimed is:

1. In a process for the production of insulated electrical conductors comprising applying a coating of polymeric ethylene terephthalate to electrical conductors, the improvement comprising (1) coating the conductor with molten polyethylene terephthalate having an initial relative viscosity of at least 1.80 and containing 0.01 to 5% by weight of a liquid selected from the group consisting of aliphatic ketones, aromatic ketones, mixed aliphatic-aromatic ketone, aliphatic amines, aromatic amines, mixed aliphatic-aromatic amines and halogenated aliphatic hydrocarbons, (2) cooling said coating and (3) heating the cooled coating to a temperature of at least 100° C. to effect a crystallization of at least 15% in said polymeric coating.

2. The process of claim 1 wherein said liquid is benzophenone.

3. The process of claim 1 wherein said molten polyethylene terephthalate additionally contains from 0.001 to 0.5% by weight of an undissolved solid substance selected from the group consisting of calcined gypsum, fumed silica, talcum powder, graphite, glass, magnesium oxide, copper powder, antimony powder and salts of alkaline earth metals, said solid substance being uniformly dispersed in said polyethylene terephthalate and having an average particle size of less than 3 microns.

4. The process of claim 1 wherein said solid substance is an alkaline earth metal compound.

5. The process of claim 1 wherein said solid substance is talcum.

6. The process of claim 1 wherein said polyethylene terephthalate has an initial relative viscosity of at least 2.0.

7. The process of claim 1 wherein thermal treatment of the polyester covering is effected in the presence of steam.

8. The process of claim 7 wherein said polyester covering is subjected to a temperature ranging from 120–190° C. to effect at least 25% crystallization of said polyester.

References Cited

UNITED STATES PATENTS

| | | | |
|---|---|---|---|
| 2,249,950 | 7/1941 | Fuller | 260—75 |
| 2,465,319 | 3/1949 | Whinfield et al. | 260—75 |
| 2,683,100 | 7/1954 | Edgar et al. | 117—232 |
| 2,993,019 | 7/1961 | Snyder | 117—232 |
| 3,017,380 | 1/1962 | D'Alelio | 117—232 |
| 3,022,200 | 2/1962 | Koerner et al. | 117—232 |
| 3,072,679 | 1/1963 | Batzer et al. | 117—232 |
| 3,100,722 | 8/1963 | Herrmann et al. | 117—161UX |
| 3,126,360 | 3/1964 | Riehl | 260—75 |
| 3,154,605 | 10/1964 | Meyer et al. | 117—119.6 |
| 3,160,605 | 12/1964 | Kantor et al. | 117—232 |
| 3,220,973 | 11/1965 | Goldberg | 117—232 |
| 3,244,675 | 4/1966 | Angelo | 117—232 |
| 3,360,500 | 12/1967 | Hergenrother | 260—75 |
| 3,381,060 | 4/1968 | Peacock et al. | 117—232 |

OTHER REFERENCES

Polyesters and Their Applications, by Bjorksten Research Laboratories, Inc., Johan Bjorksten Pres., copyright 1956.

WILLIAM D. MARTIN, Primary Examiner

R. M. SPEER, Assistant Examiner

U.S. Cl. X.R.

117—161

UNITED STATES PATENT OFFICE
CERTIFICATE OF CORRECTION

Patent No. 3,579,379　　　　　　　　　　Dated May 18, 1971

Inventor(s)　Franciscus C. A. A. van Berkel et al.

It is certified that error appears in the above-identified patent and that said Letters Patent are hereby corrected as shown below:

In the heading to the printed specification, lines 5 to 7, "Franciscus C. A. A. van Berkel, 8 Deerfield Road, Asheville, N. C., and Stanley F. Luques, Lakeview Drive, Columbia, Conn." should read -- Franciscus C. A. A. van Berkel, Asheville, N. C., and Stanley F. Luques, Columbia, Conn., assignors to American Enka Corporation, Enka, N. C., a corporation of Delaware --.

Signed and sealed this 30th day of November 1971.

(SEAL)
Attest:

EDWARD M. FLETCHER, JR.　　　　　　ROBERT GOTTSCHALK
Attesting Officer　　　　　　　　　　Acting Commissioner of Patents